United States Patent
Chilikin et al.

(10) Patent No.: US 11,681,565 B2
(45) Date of Patent: Jun. 20, 2023

(54) TECHNOLOGIES FOR HIERARCHICAL CLUSTERING OF HARDWARE RESOURCES IN NETWORK FUNCTION VIRTUALIZATION DEPLOYMENTS

(71) Applicant: Intel Corporation, Santa Clara, CA (US)

(72) Inventors: Andrey Chilikin, Limerick (IE); Sugesh Chandran, Mallow (IE)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 16/131,008

(22) Filed: Sep. 13, 2018

(65) Prior Publication Data

US 2019/0042326 A1 Feb. 7, 2019

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 10,838,902 B2* | 11/2020 | Vijayrao | ............... | G06F 9/5044 |
| 2007/0067462 A1* | 3/2007 | Takeda | ............... | G06F 11/2007 709/227 |
| 2015/0163163 A1* | 6/2015 | Kato | ....................... | H04L 67/34 709/226 |
| 2015/0365352 A1* | 12/2015 | Xiang | ................. | H04L 41/0806 709/226 |
| 2016/0057234 A1* | 2/2016 | Parikh | ..................... | H04L 67/16 709/226 |
| 2019/0166010 A1* | 5/2019 | Dome | .................... | G06N 20/00 |
| 2021/0303332 A1* | 9/2021 | Inoue | .................... | G06F 9/5077 |

* cited by examiner

*Primary Examiner* — Scott B Christensen
*Assistant Examiner* — Lam T Do
(74) *Attorney, Agent, or Firm* — Compass IP Law PC

(57) ABSTRACT

Technologies for the hierarchical clustering of hardware resources in network function virtualization (NFV) deployments include a compute node that is configured to create a network function profile that includes a plurality of network functions to be deployed on the compute node. Additionally, the compute node is configured to translate the network function profile usable to identify which of the plurality of network functions are to be managed by each of the plurality of interconnected hardware resources into a hardware profile for each of a plurality of interconnected hardware resources. The compute node is further configured to deploy each of the plurality of network functions to one or more of the plurality of interconnected hardware resources based on the hardware profile. Other embodiments are described herein.

14 Claims, 6 Drawing Sheets

TECHNOLOGIES FOR HIERARCHICAL CLUSTERING OF HARDWARE RESOURCES IN NETWORK FUNCTION VIRTUALIZATION DEPLOYMENTS

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs one or more processing operations on the network packet (e.g., security, network address translation (NAT), load-balancing, deep packet inspection (DPI), transmission control protocol (TCP) optimization, caching, Internet Protocol (IP) management, etc.). Such processing is often compute intensive and/or latency sensitive. Certain compute intensive and/or latency sensitive applications, such as enterprise cloud-based applications (e.g., software as a service (SaaS) applications), data mining applications, data-driven modeling applications, scientific computation problem solving applications, etc., can benefit from being processed on specialized, high-performance computing (HPC) devices typically found in complex, large-scale computing environments (e.g., HPC environments, cloud computing environments, etc.). However, present technologies using such hardware accelerators in commercial deployments generally lack relevant network function support. As compared to software virtual switch solutions, present hardware offload solutions are typically inadequate to support all of the deployment requirements, which may be due to limited resource availability, complexity of firmware modification, software enablement cost, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
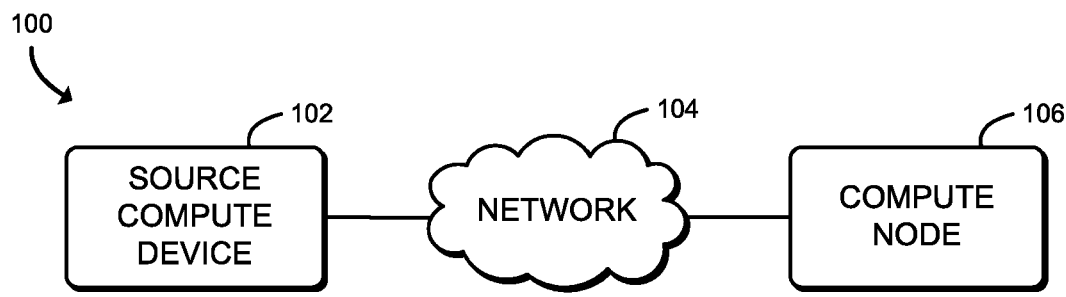
FIG. 1 is a simplified block diagram of at least one embodiment of a system for hierarchical clustering of hardware resources in network function virtualization (NFV) deployments that includes a source compute device and a compute node communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for hierarchical clustering of hardware resources in network function virtualization (NFV) deployments includes a source compute device 102 communicatively coupled to a compute node 106 via a network 104. While illustratively shown as having a single source compute device 102 and a single compute node 106, the system 100 may include multiple source compute devices 102 and multiple network compute nodes 106, in other embodiments. It should be appreciated that the source compute device 102 and compute node 106 have been illustratively described herein as being one of a "source" of network traffic (i.e., the source compute device 102) and a "destination" of the network traffic (i.e., the compute node 106) for the purposes of providing clarity to the description. It should be further appreciated that, in some embodiments, the source compute device 102 and the compute node 106 may reside in the same data center or high-performance computing (HPC) environment. In other words, the source compute device 102 and compute node 106 may reside in the same network 104 connected via one or more wired and/or wireless interconnects. Depending on the embodiment, the compute node 106 may be deployed at a device edge, in a fog network, in a cloud architecture, in a data center, and/or any other network architecture.

In operation, the source compute device 102 and the compute node 106 transmit and receive network traffic (e.g., network packets, frames, etc.) to/from each other. For example, the compute node 106 may receive a network packet from the source compute device 102. Oftentimes, more than one processing operation (e.g., security, network address translation (NAT), load-balancing, deep packet inspection (DPI), transmission control protocol (TCP) optimization, caching, Internet Protocol (IP) management, etc.) is required to be performed on at least a portion of the received network packet. To perform such network packet processing operations, the compute node 106 is configured to virtualize various network functions to execute the processing operations. Such virtualized network functions (VNFs) may include firewall services, NAT services, DPI services, evolved packet core (EPC) services, mobility management entity (MME) services, packet data network gateway (PGW) services, serving gateway (SGW) services, billing services, TCP optimization services, etc.

Additionally, the compute node 106 is configured to place the VNFs into various virtual machines (VMs) or containers to perform the respective virtualized network services on network traffic and to manage the network traffic across the various VMs. It should be understood that a VM is a software program or operating system that not only exhibits the behavior of a separate computer, but is also capable of performing tasks such as running applications and programs (e.g., the VNFs) like a separate computer. Commonly referred to as a "guest," VMs are typically configured to run a dedicated operating system on shared physical hardware resources of the device (e.g., the compute node 106) on which the VM has been deployed, commonly referred to as a "host." It should be appreciated that multiple VMs can exist within a single host at a given time.

In use, which will be described in further detail below, the compute node 106 optimizes resource usage of interconnected resources to meet different NFV workload requirements. To do so, the compute node 106 is configured to identify a set of interconnected resources present on the compute node 106 that can form a cluster of hardware resources, or a hardware resource pool. Such interconnected resources may include a set of interconnected accelerators (e.g., field-programmable gate arrays (FPGAs), application specific integrated circuit (ASICs)), switch interconnected network interface controllers (NICs) (e.g., multi-homed NICs, hybrid switch/NICs, etc.), or the like.

The compute node 106 is configured identify, allocate, and configure the interconnected resources in the hardware resource cluster/pool to meet the different NFV workload requirements. To do so, the compute node 106 defines a hardware profile for each of the interconnected resources based on a network function profile. The hardware profile indicates which network functions are to be deployed and/or managed by a respective hardware component. For example, in such embodiments in which the hardware component is an accelerator, the hardware profile is an accelerator profile that identifies which network functions are to be deployed on each of the cluster/pool of accelerators (see, e.g., the illustrative accelerator profile 700 of FIG. 7). In another example, in such embodiments in which the hardware component is a NIC, the hardware profile is a NIC profile that identifies which NICs are to manage the network traffic to network functions deployed on respective hosts communicatively coupled to a corresponding NIC in the NIC profile.

The network function profile may be represented as a hierarchical tree of network functions that are to be formed based on various network traffic characteristics (e.g., network traffic patterns, network traffic volume, etc.), network function characteristics (e.g., a priority associated with each network function, a workload type associated with the network function to be performed, etc.), and/or network characteristics (e.g., a topology of the network in which the compute node 106 has been deployed). The compute node 106 further translates the network function profile into a hardware profile (e.g., an accelerator profile, a NIC packet processing pipeline profile, etc.) usable to identify which network functions are to be deployed on which interconnected resources. Accordingly, the compute node 106 can deploy each network function to a respective one or more interconnected resources based on the corresponding hardware profile.

Figure 2:
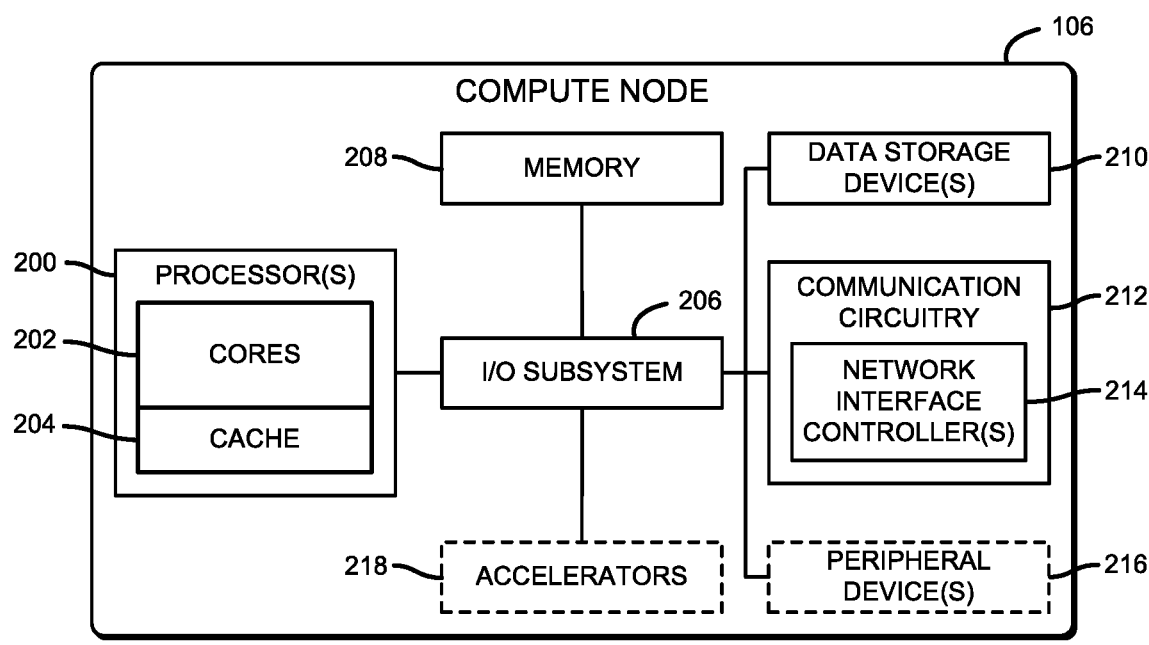
FIG. 2 is a simplified block diagram of at least one embodiment of a compute node of the system of FIG. 1.

The compute node 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart network interface controller (NIC)/HFI, a network appliance (e.g., physical or virtual), a router, a switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system. Referring now to FIG. 2, an illustrative compute node 106 is shown that includes one or more processors 200, memory 208, an I/O subsystem 206, one or more data storage devices 210, communication circuitry 212, and, in some embodiments, one or more peripheral devices 216 and/or hardware accelerators 218. It should be appreciated that the compute node 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 200 may be embodied as any type of device or collection of devices capable of performing the various compute functions as described herein. In some embodiments, the processor(s) 200 may be embodied as one or more multi-core processors, digital signal processors (DSPs), microcontrollers, or other processor(s) or processing/controlling circuit(s). In some embodiments, the processor(s) 200 may be embodied as, include, or otherwise be coupled to an integrated circuit, an embedded system, an FPGA (e.g., reconfigurable circuitry), a system-on-a-chip (SOC), an ASIC, reconfigurable hardware or hardware circuitry, or other specialized hardware to facilitate performance of the functions described herein.

The illustrative processor(s) 200 includes multiple processor cores 202 (e.g., two processor cores, four processor cores, eight processor cores, sixteen processor cores, etc.) and a cache memory 204. Each of processor cores 202 may be embodied as an independent logical execution unit capable of executing programmed instructions. It should be appreciated that, in some embodiments, the compute node 106 (e.g., in supercomputer embodiments) may include thousands of processor cores. Each of the processor(s) 200 may be connected to a physical connector, or socket, on a motherboard (not shown) of the compute node 106 that is configured to accept a single physical processor package (i.e., a multi-core physical integrated circuit). Further, each the processor cores 202 is communicatively coupled to at least a portion of the cache memory 204 and functional units usable to independently execute programs, operations, threads, etc.

The cache memory 204, which may be embodied as any type of cache that the processor(s) 200 can access more quickly than the memory 208 (i.e., main memory), such as an on-die cache, or on-processor cache. In other embodiments, the cache memory 204 may be an off-die cache, but reside on the same system-on-a-chip (SoC) as a processor 200. Depending on the embodiment, the cache memory 204 may include a multi-level cache architecture embodied as a mid-level cache (MLC) (e.g., dedicated to a particular one of the processor cores 202) and a last-level cache (LLC), or shared cache (e.g., shared by all of the processor cores 202 of a processor 200).

The memory 208 may be embodied as any type of volatile or non-volatile memory or data storage capable of performing the functions described herein. In operation, the memory 208 may store various data and software used during operation of the compute node 106, such as operating systems, applications, programs, libraries, and drivers. It should be appreciated that the memory 208 may be referred to as main memory (i.e., a primary memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

Each of the processor(s) 200 and the memory 208 are communicatively coupled to other components of the compute node 106 via the I/O subsystem 206, which may be embodied as circuitry and/or components to facilitate input/output operations with the processor(s) 200, the memory 208, and other components of the compute node 106. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a SoC and be incorporated, along with one or more of the processors 200, the memory 208, and other components of the compute node 106, on a single integrated circuit chip.

The one or more data storage devices 210 may be embodied as any type of storage device(s) configured for short-term or long-term storage of data, such as, for example, memory devices and circuits, memory cards, hard disk drives, solid-state drives, or other data storage devices. Each data storage device 210 may include a system partition that stores data and/or firmware code for the data storage device 210. Each data storage device 210 may also include an operating system partition that stores data files and executables for an operating system.

The communication circuitry 212 may be embodied as any communication circuit, device, or collection thereof, capable of enabling communications between the compute node 106 and other computing devices, such as the source compute device 102, as well as any network communication enabling devices, such as an access point, switch, router, etc., to allow communication over the network 104. Accordingly, the communication circuitry 212 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 212 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the compute node 106, etc.), performing computational functions, etc.

In some embodiments, performance of one or more of the functions of communication circuitry 212 as described herein may be performed by specialized circuitry, hardware, or combination thereof of the communication circuitry 212, which may be embodied as a SoC or otherwise form a portion of a SoC of the compute node 106 (e.g., incorporated on a single integrated circuit chip along with one of the processor(s) 200, the memory 208, and/or other components of the compute node 106). Alternatively, in some embodiments, the specialized circuitry, hardware, or combination thereof may be embodied as one or more discrete processing units of the compute node 106, each of which may be capable of performing one or more of the functions described herein.

The illustrative communication circuitry 212 includes one or more NICs 214, which may also be referred to as host fabric interfaces (HFIs) in some embodiments (e.g., high performance computing (HPC) environments). The one or more NICs 214 may be embodied as one or more add-in-boards, daughtercards, network interface cards, controller chips, chipsets, or other devices that may be used by the compute node 106 to connect with another compute device (e.g., the source compute device 102) or otherwise facilitate the ingress and egress of network traffic to and from the compute node 106. In an illustrative embodiment, the NICs may be embodied as a hybrid switch and NIC, or a multi-homed NIC, which includes a switch (physical or virtual) and one or more physical or virtual NICs (see, e.g., the illustrative multi-homed NIC 604 of FIGS. 6 and 7).

Alternatively, in some embodiments, each of the one or more NICs 214 may be embodied as part of a SoC that includes one or more processors, or included on a multichip package that also contains one or more processors. Depending on the embodiment, each of the one or more NICs 214 may include a local processor (not shown) and/or a local memory (not shown) that are both local to each of the one or more NICs 214. In such embodiments, the local processor may be capable of performing one or more of the functions of a processor 200, as described herein. Additionally or alternatively, in such embodiments, the local memory may be integrated into one or more components of the compute node 106 at the board level, socket level, chip level, and/or other levels. While not illustratively shown, it should be appreciated that each of the NICs 214 typically includes one or more physical ports (e.g., for facilitating the ingress and egress of network traffic) and, in some embodiments, one or more accelerator (e.g., ASIC, FPGA, etc.) and/or offload hardware components for performing/offloading certain network functionality and/or processing functions (e.g., a DMA engine).

The one or more peripheral devices 128 may include any type of device that is usable to input information into the compute node 106 and/or receive information from the compute node 106. The peripheral devices 128 may be embodied as any auxiliary device usable to input information into the compute node 106, such as a keyboard, a mouse, a microphone, a barcode reader, an image scanner, etc., or output information from the compute node 106, such as a display, a speaker, graphics circuitry, a printer, a projector, etc. It should be appreciated that, in some embodiments, one or more of the peripheral devices 128 may function as both an input device and an output device (e.g., a touchscreen display, a digitizer on top of a display screen, etc.). It should be further appreciated that the types of peripheral devices 128 connected to the compute node 106 may depend on, for example, the type and/or intended use of the compute node 106. Additionally or alternatively, in some embodiments, the peripheral devices 128 may include one or more ports, such as a USB port, for example, for connecting external peripheral devices to the compute node 106.

Each of the accelerators 218 may be embodied as any type of specialized hardware on which operations can be performed faster and/or more efficiently than is possible on a more general-purpose processor (e.g., the processor(s) 200). For example, the accelerators 218 may be embodied as, but not limited to, an FPGA, an ASIC, or other specialized circuitry. It should be appreciated that, in such embodiments in which the compute node 106 includes the accelerators 218, at least two of the accelerators 218 are capable of being interconnected (e.g., via a point-to-point processor interconnect, such as the Intel® UltraPath Interconnect (UPI) as illustratively shown in FIG. 5) to form a cluster/pool of accelerator resources.

Referring back to FIG. 1, the source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative compute node 106 of FIG. 2. As such, figures and descriptions of the like components are not repeated herein for clarity of the description with the understanding that the description of the corresponding components provided above in regard to the compute node 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the compute node 106 and the source compute device 102, which are not shown to preserve clarity of the description.

Figure 3:
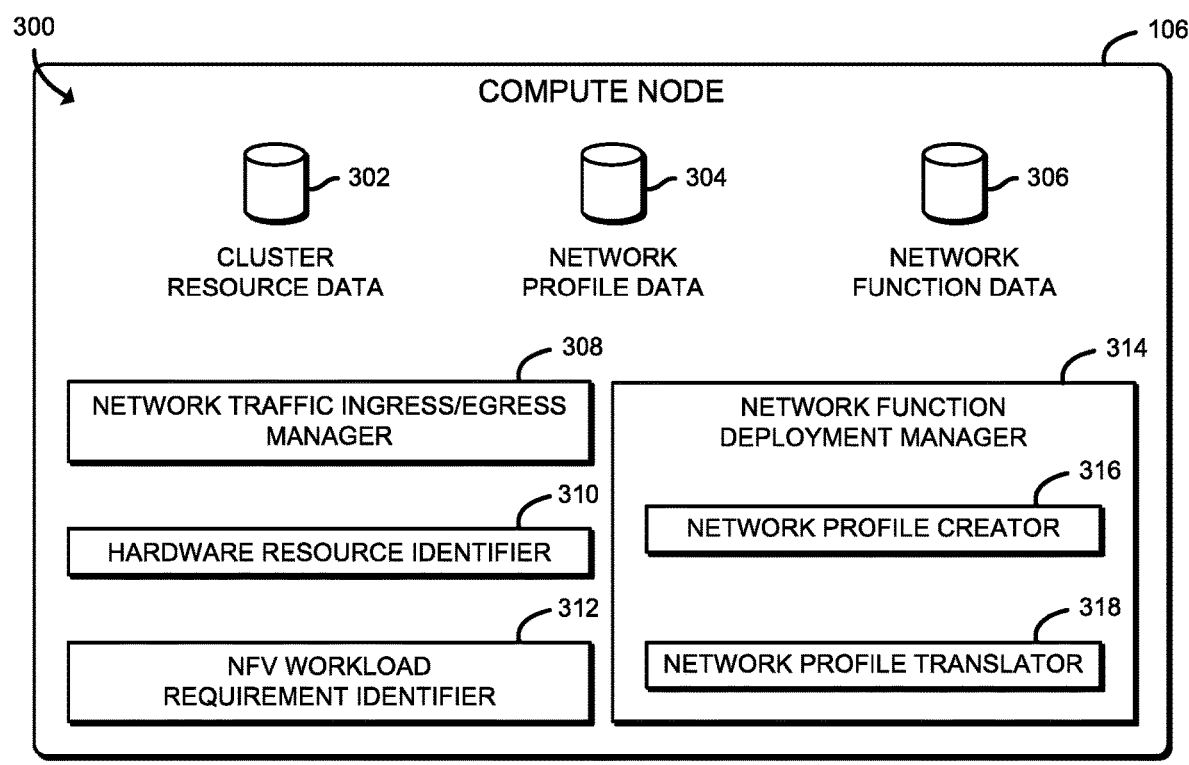
FIG. 3 is a simplified block diagram of at least one embodiment of an environment of the compute node of FIGS. 1 and 2.

Referring now to FIG. 3, in use, the compute node 106 establishes an environment 300 during operation. The illustrative environment 300 includes a network traffic ingress/egress manager 308, a hardware resource identifier 310, an NFV workload requirement identifier 312, and a network function deployment manager 314. The various components of the environment 300 may be embodied as hardware, firmware, software, or a combination thereof. As such, in some embodiments, one or more of the components of the environment 300 may be embodied as circuitry or collection of electrical devices (e.g., network traffic ingress/egress management circuitry 308, hardware resource identification circuitry 310, NFV workload requirement identification circuitry 312, network function deployment management circuitry 314, etc.).

As illustratively shown, the network traffic ingress/egress management circuitry 308, the hardware resource identification circuitry 310, the NFV workload requirement identification circuitry 312, and the network function deployment management circuitry 314 form a portion of the compute node 106. It should be appreciated that one or more functions described herein as being performed by the network traffic ingress/egress management circuitry 308, the hardware resource identification circuitry 310, the NFV workload requirement identification circuitry 312, and the network function deployment management circuitry 314 may be performed, at least in part, by one or more hardware resources of the compute node 106, such as one or more of the processors 200, the I/O subsystem 206, the communication circuitry 212 (e.g., the one or more NICs 214), an accelerator 218, and/or other components of the compute node 106. It should be further appreciated that associated instructions may be stored in the cache memory 204, the memory 208, the data storage device(s) 210, and/or other data storage location, which may be executed by one of the processors 200, the accelerators 218, and/or other computational component of the compute node 106.

Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor(s) 200, the accelerators 218, the NIC(s) 214, or other components of the compute node 106. It should be appreciated that the compute node 106 may include other components, sub-components, modules, sub-modules, logic, sub-logic, and/or devices commonly found in a computing device, which are not illustrated in FIG. 3 for clarity of the description.

In the illustrative environment 300, the compute node 106 additionally includes cluster resource data 302, network function profile data 304, and network function data 306, each of which may be accessed by the various components and/or sub-components of the compute node 106. Further, each of the cluster resource data 302, the network function profile data 304, and the network function data 306 may be accessed by the various components of the compute node 106. Additionally, it should be appreciated that in some embodiments the data stored in, or otherwise represented by, each of the cluster resource data 302, the network function profile data 304, and the network function data 306 may not be mutually exclusive relative to each other. For example, in some implementations, data stored in the cluster resource data 302 may also be stored as a portion of one or more of the network function profile data 304 and/or the network function data 306, or in another alternative arrangement. As such, although the various data utilized by the compute node 106 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 308 is configured to facilitate inbound network communications (e.g., network traffic, network packets, network flows, etc.) to the compute node 106 (e.g., from the source compute device 102). Accordingly, the network traffic ingress/egress manager 308 is configured to manage (e.g., create, modify, delete, etc.) connections to physical and virtual network ports (i.e., virtual network interfaces) of the compute node 106 (e.g., via the communication circuitry 212), as well as the ingress buffers/queues associated therewith. Additionally, the network traffic ingress/egress manager 308 is configured to facilitate outbound network communications (e.g., network traffic, network packet streams, network flows, etc.) from the compute node 106. To do so, the network traffic ingress/egress manager 308 is configured to manage (e.g., create, modify, delete, etc.) connections to physical and virtual network ports/interfaces of the compute node 106 (e.g., via the communication circuitry 212), as well as the egress buffers/queues associated therewith.

The hardware resource identifier 310, which may be embodied as hardware, firmware, software, virtualized hardware, emulated architecture, and/or a combination thereof as discussed above, is configured to identify those interconnected hardware resources which are capable of being pooled into a resource cluster for performing at least a portion of the functions described herein. For example, depending on the embodiment, the hardware resource identifier 310 may be configured to identify one or more interconnected accelerators (e.g., the accelerators 218 of FIG. 2), one or more interconnected NICs (e.g., the NICs 214 of FIG. 2), etc. In some embodiments, information associated with the clustered resources may be stored in the cluster resource data 302.

The NFV workload requirement identifier 312, which may be embodied as hardware, firmware, software, virtualized hardware, emulated architecture, and/or a combination thereof as discussed above, is configured to identify workload requirements associated with the packet processing operations to be performed on network traffic received by the compute node 106. To do so, the NFV workload requirement identifier 312 is configured to collect one or more network traffic characteristics, network function characteristics, and/or network characteristics to identify a set of NFV workload requirements. The network traffic characteristics may include any type of information associated with the network traffic received at the compute node 106, such as network traffic patterns, network traffic volume, etc. The network function characteristics may include any type of information associated with a network function to be deployed by the compute node 106, such as a priority associated with each network function, a workload type associated with the network function to be performed, etc. The network characteristics may include any type of data associated with the network (e.g., a topology of the network) in which the compute node 106 has been deployed. In some embodiments, the workload requirement identifying characteristics (e.g., the network traffic characteristics, the network function characteristics, the network characteristics, etc.) may be stored in the network function profile data 304.

The network function deployment manager 314, which may be embodied as hardware, firmware, software, virtualized hardware, emulated architecture, and/or a combination thereof as discussed above, is configured to manage the deployment of the network functions of the compute node 106. To do so, the illustrative network function deployment manager 314 includes a network function profile creator 316 and a network function profile translator 318. The network function profile creator 316 is configured to create a network function profile that is translatable into a hardware profile (e.g., by the network function profile translator 318). To do so, the network function profile creator 316 is configured to identify a set of network functions that are to be deployed at the compute node 106 and identify a network function usage for each network function based on one or more of a set of NFV workload requirements (e.g., as identified by the NFV workload requirement identifier 312). The network function usage may be any information usable to identify a distribution of total network traffic (e.g., as determined by the NFV workload requirements) relative to an identified network function to be deployed at the compute node 106.

For example, the network function profile creator 316 is configured to identify a percentage of total network traffic that is to be performed by a particular network function. The network function profile creator 316 is additionally configured to determine whether each network function is needed at one or more sockets (i.e., physical connectors) connecting a respective one of the processors 200 to a motherboard of the compute node 106. Additionally, the network function profile creator 316 is configured to identify a priority level associated with each network function. In some embodiments, information associated with the network function profiles (e.g., the percentage of the total network traffic to be processed by a network function, the number of required sockets on which a network function is to be deployed, the priority of a network function relative to the other network functions, etc.) may be stored in the network function profile data 304.

The network function profile translator 318 is configured to translate the network function profiles (e.g., such as may be created by the network function profile creator 316) into hardware profiles. It should be appreciated that the network function profile translator 318 is configured to translate the network function profiles into the hardware profiles based on the type of hardware of the interconnected resource cluster. Accordingly, the network function deployment manager 312 can deploy the necessary network functions across the identified interconnected resource cluster based on the hardware profiles. In some embodiments, information associated with the hardware profiles, as well as any network function deployment related information, may be stored in the network function data 306.

As described previously, the resource cluster may include multiple accelerators (e.g., the accelerators 218 of FIG. 2), multiple NICs (e.g., an embodiment of the one or more NICs 214 of FIG. 2 that includes multiple NICs), or any other type of hardware that can be clustered into a pool of resources to perform the functions as described herein. In such embodiments in which the resource cluster includes multiple accelerators, the network function profile translator 318 is configured to translate the network function profiles into individual accelerator profiles for each of the accelerators. Similarly, in such embodiments in which the resource cluster includes multiple NICs, the network function profile translator 318 is configured to translate the network function profiles into individual NIC packet processing pipeline profiles for each of the NICs.

Figure 4:
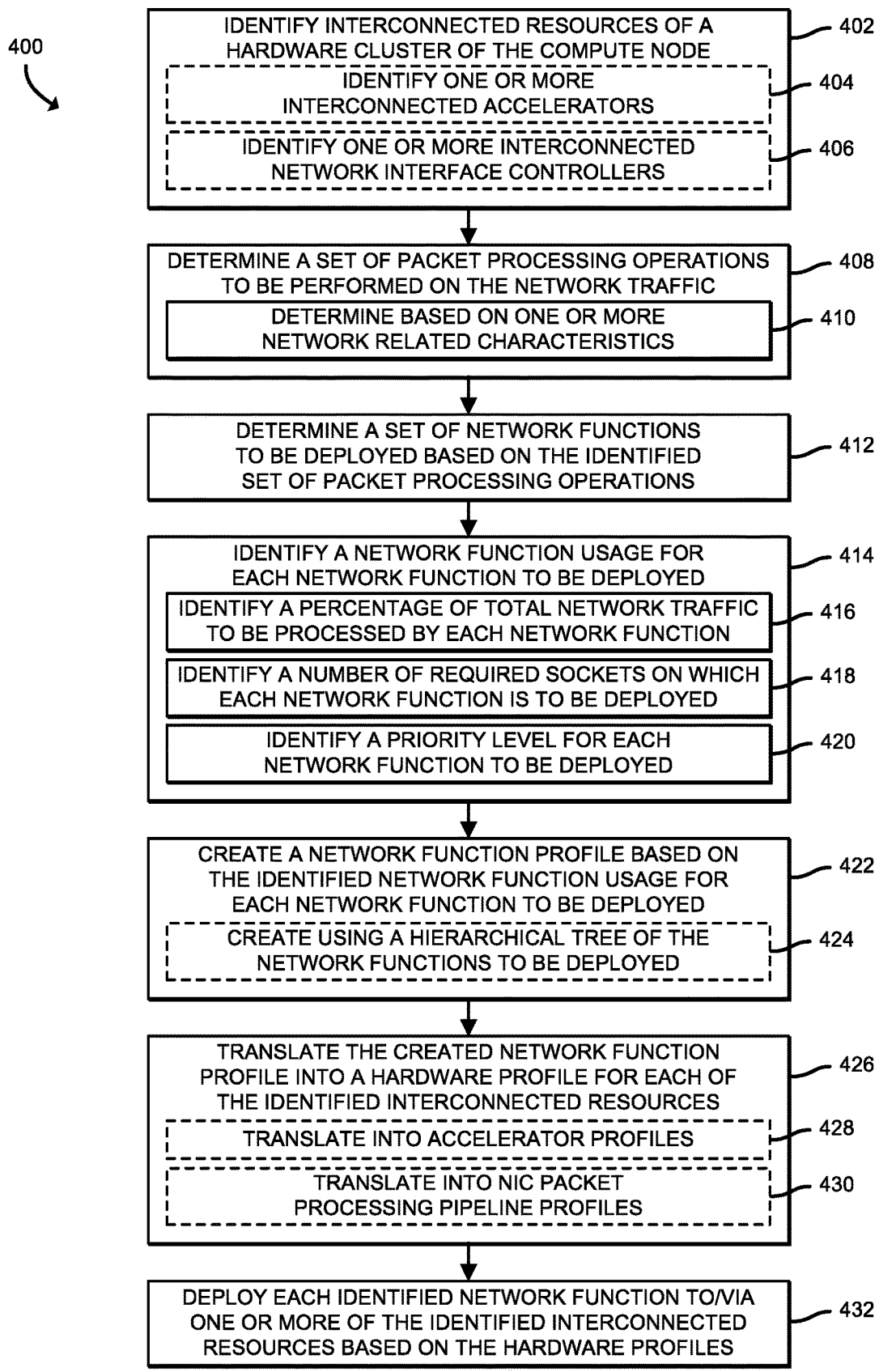
FIG. 4 is a simplified flow diagram of at least one embodiment of a method for the hierarchical clustering of hardware resources in NFV deployments that may be executed by the network compute device of FIGS. 1-3.

Referring now to FIG. 4, a method 400 for managing the hierarchical clustering of hardware resources in NFV deployments is shown which may be executed by a compute node (e.g., the compute node 106 of FIGS. 1-3). The method 400 begins with block 402, in which the compute node 106 identifies interconnected resources of a hardware cluster of the compute node 106. In an illustrative embodiment, the resource cluster may include multiple accelerators (e.g., the accelerators 218 of FIG. 2). Accordingly, in such embodiments, in block 404, the compute node 106 may identify one or more interconnected accelerators. In another illustrative embodiment, the resource cluster may include multiple NICs (e.g., a switch/multi-NIC embodiment of the one or more NICs 214 of FIG. 2). Accordingly, in such embodiments, in block 406, the compute node 106 may identify one or more interconnected NICs.

In block 408, the compute node 106 identifies a set of packet processing operations to be performed on the network traffic. As described previously, the compute node 106 may identify any number of processing operations to be performed on data of a respective received network packet, including, but not limited to, security processing operations, NAT processing operations, load-balancing processing operations, DPI processing operations, TCP optimization processing operations, IP management processing operations, etc. In block 410, the compute node 106 may determine the network packet processing operations based on one or more network related characteristics, such as one or more network traffic characteristics (e.g., network traffic patterns, network traffic volume, etc.), network function characteristics (e.g., a priority associated with each network function, a workload type associated with the network function to be performed, etc.), network characteristics (e.g., a topology of the network), etc.

In block 412, the compute node 106 determines a set of network functions to be deployed on the compute node 106 based on the identified set of network packet processing operations. As described previously, the network functions may include, but are not limited to, firewall services, NAT services, DPI services, EPC services, MME services, PGW services, SGW services, billing services, TCP optimization services, etc. In block 414, the compute node 106 identifies a network function usage for each network function to be deployed. To do so, in block 416, the compute node 106 identifies a percentage of total network traffic to be processed by each network function to be deployed. Additionally, in block 418, the compute node 106 identifies a number of required sockets on which each network function is to be deployed. Further, in block 420, the compute node 106 identifies a priority level for each network function to be deployed. Depending on the embodiments, the priority level may be one of high, medium, or low, or be assigned a numerical value for a more granular priority level designation.

In block 422, the compute node 106 creates a network function profile based on the network function usage identified for each network function to be deployed. To do so, in block 424, the compute node 106 creates the network function profile using a hierarchical tree of the network functions to be deployed. In block 426, the compute node 106 translates the created network function profile into a hardware profile for each of the identified interconnected resources. For example, in block 428, for those embodiments in which the identified interconnected resources are accelerators, the compute node 106 translates the network function profiles into an accelerator profile for each interconnected accelerator. In another example, in block 430, for those embodiments in which the identified interconnected resources are NICs (e.g., a multi-homed NIC), the compute node 106 translates the network function profiles into a NIC packet processing pipeline profile for each interconnected NIC. In block 432, the compute node 106 deploys each identified network function to/via one or more of the identified interconnected resources based on the respective hardware profiles for each of the identified interconnected resources.

Figure 5:
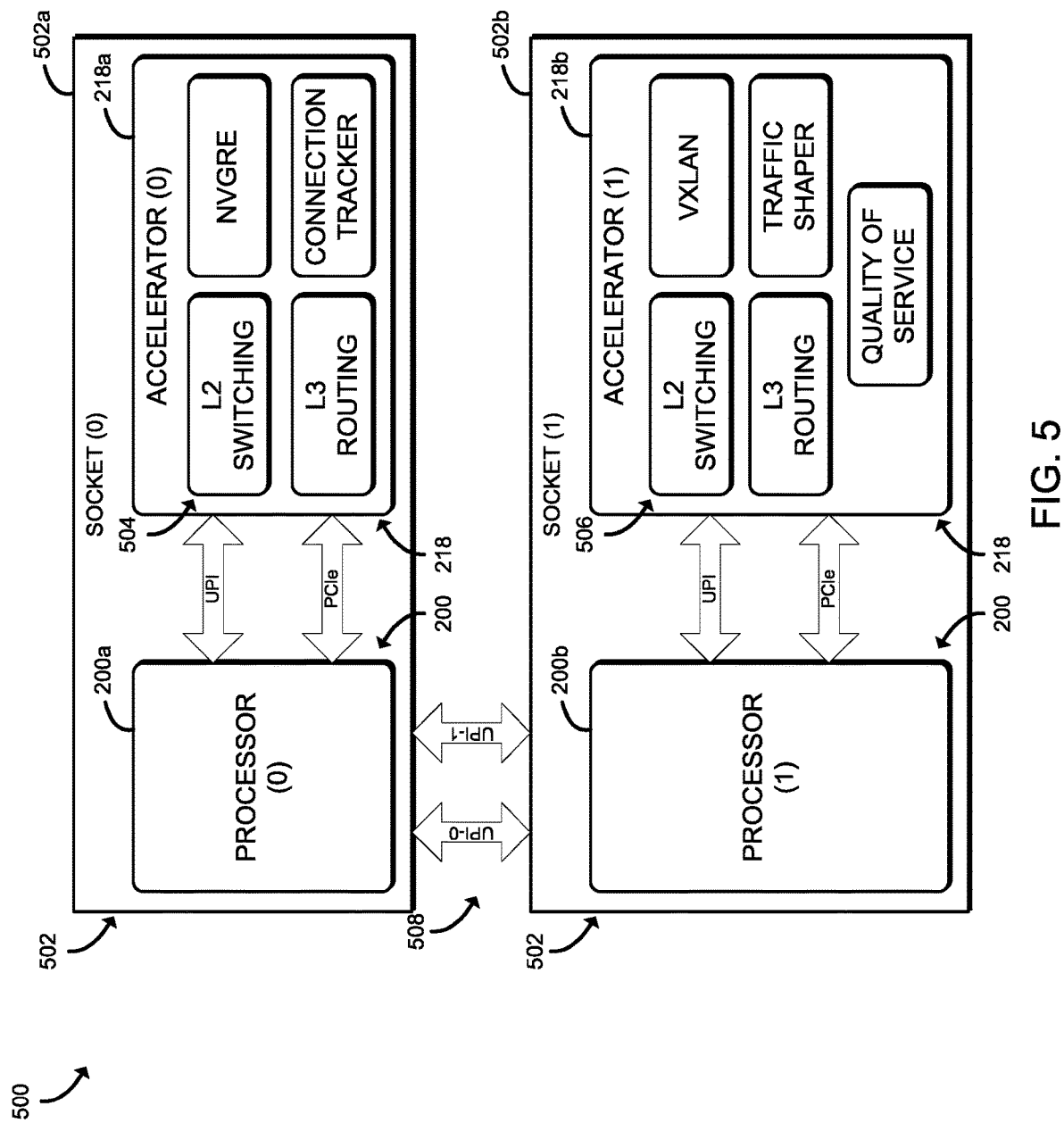
FIG. 5 is a simplified block diagram of at least one embodiment of an accelerator resource cluster of the compute node of FIGS. 1-3 that includes multiple accelerators.

Referring now to FIG. 5, in use, the compute node 106 establishes an illustrative accelerator resource cluster 500 for the hierarchical clustering of accelerators in NFV deployments. The illustrative accelerator resource cluster 500 includes two sockets 502, the first socket designated as socket (0) 502*a* and the second socket designated socket (1) 502*b*. Each of the illustrative sockets 502 includes a low-performance processor (e.g., one of the processor(s) 200 of FIG. 2) and an accelerator (e.g., one of the accelerators 218 of FIG. 2), which are communicatively coupled via one or more interconnects, such as the Peripheral Component Interconnect Express (PCIe) interconnect and the UPI interconnect, as illustratively shown. Additionally, each of the sockets 502 is communicatively coupled via one or more socket interconnects 508, such as the UPI interconnects as illustratively shown. The illustrative socket (0) 502a includes a low-performance processor designated as processor (0) 200a and an accelerator designated as accelerator (0) 218a, and the illustrative socket (1) 502b includes a low performance processor designated as processor (0) 200b and an accelerator designated as accelerator (1) 218b. While not illustratively shown, it should be appreciated that each of the sockets 502 is illustratively coupled to memory (e.g., the memory 208 of FIG. 2).

As also illustratively shown, the accelerator (0) 218a of the socket (0) 502a includes multiple network functions 504 and the accelerator (1) 218b of the socket (1) 502b include multiple network functions 506. However, unlike traditional techniques for network function deployment in which all applicable network functions are deployed to each of the accelerators, the set of network functions 504 deployed on the accelerator (0) 218a are different from the set of network functions 506 deployed on the accelerator (1) 218b. More particularly, while each of the accelerators 218 includes L2 switching and L3 routing network functions, the illustrative accelerator (0) 218a includes a Network Virtualization using Generic Routing Encapsulation (NVGRE) network function and a connection tracker network function, whereas the illustrative accelerator (1) 218b includes a Virtual Extensible LAN (VxLAN) network function, a traffic shaper network function, and a quality of service (QoS) network function.

Figure 6:
FIG. 6 is a simplified block diagram of at least one embodiment of a network function profile.

As described previously, the compute node 106 is configured to identify the network functions for deployment on the compute node 106. Referring now to FIG. 6, an illustrative network function profile 600 is shown. As illustratively shown, the compute node 106 has identified for the following network functions to be deployed: an L2 switching network function, an L3 routing network function, a connection tracker network function, and a traffic shaper network function. The illustrative network function profile 600 additionally includes the percentage of total network traffic to be processed by the respective network function, as well as the number of required sockets on which each network function is to be deployed and a priority level associated therewith.

It should be appreciated that the amount of total network traffic may be evenly or unevenly distributed across the number of required sockets, such as is illustratively shown for the uneven distribution of the percentage of total network traffic to be processed by the L3 routing network function (e.g., 25% at one socket and 15% at another socket). As described previously, the compute node 106 is configured to translate the network function profile (e.g., the network function profile 600) into a hardware profile for each of the identified interconnected resources. As also described previously, the hardware profile is usable to identify which of the network functions are to be managed by each of the interconnected hardware resources.

Figure 7:
FIG. 7 is a simplified block diagram of at least one embodiment of a resource profile.

Referring now to FIG. 7, an illustrative accelerator profile 700 is shown based on the illustrative network function profile 600 of FIG. 6 are shown for deployment on two accelerators 218 (e.g., accelerator profile (0) for the accelerator (0) 218a and accelerator profile (1) for the accelerator (1) 218b of FIG. 5). Accordingly, after deploying the network functions in a cluster of accelerators 218, each accelerator (e.g., the accelerator (0) 218a and the accelerator (1) 218b) has its own personalized profile. It should be appreciated that an orchestrator, as well as the switching software, are aware about the cluster when provisioning the workload and programming the hardware (e.g., the accelerators 218).

For example, at boot up, the compute node 106 may collect the capabilities of the cluster of accelerators 218. As such, the compute node 106 (e.g., via a virtual switch or other programming capable software) can use the cluster information to program the hardware properly. One such flow example for a flow to be programmed across multiple accelerators in a cluster of accelerators consistent with the illustrative accelerator profiles of FIG. 7 consists of the L2 switching network function and the traffic shaper network function. In an illustrative embodiment in which the ingress port belongs to the accelerator (0) 218a and egress is on the accelerator (1) 218b, the flow programming into a cluster will become a set of flows in which the accelerator (0) 218a performs the L2 switching and sends the output to the accelerator (1) 218b for further processing (e.g., via an out of bounds communication channel between the accelerator (0) 218a and the accelerator (1) 218b). In furtherance of the illustrative embodiment, the traffic shaper network function is performed on the data at the accelerator (1) 218b (i.e., because the traffic shaper network function is not available on the accelerator (0) 218a) and sends the outpour via the applicable egress port.

Figure 8:
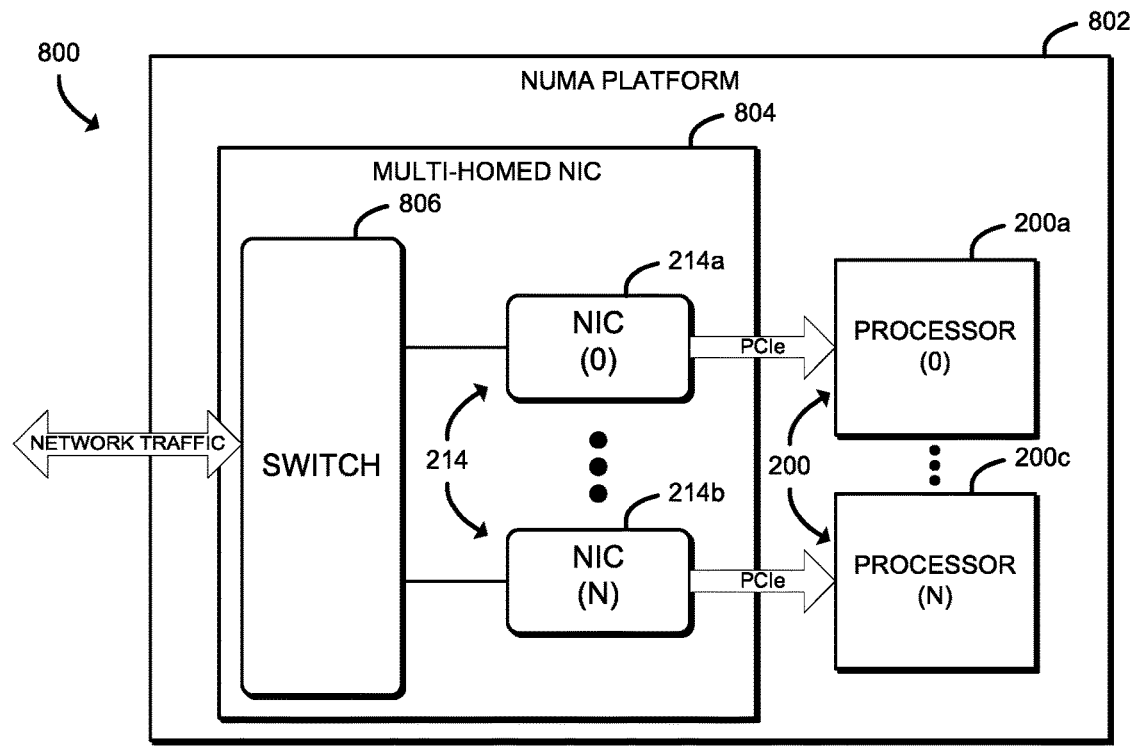
FIG. 8 is a simplified block diagram of at least one embodiment of a network interface controller (NIC) resource cluster of the compute node of FIGS. 1-3 that includes a multi-homed NIC in a non-uniform memory access (NUMA) platform design communicatively coupled to more than one processor of the compute node.
Figure 9:
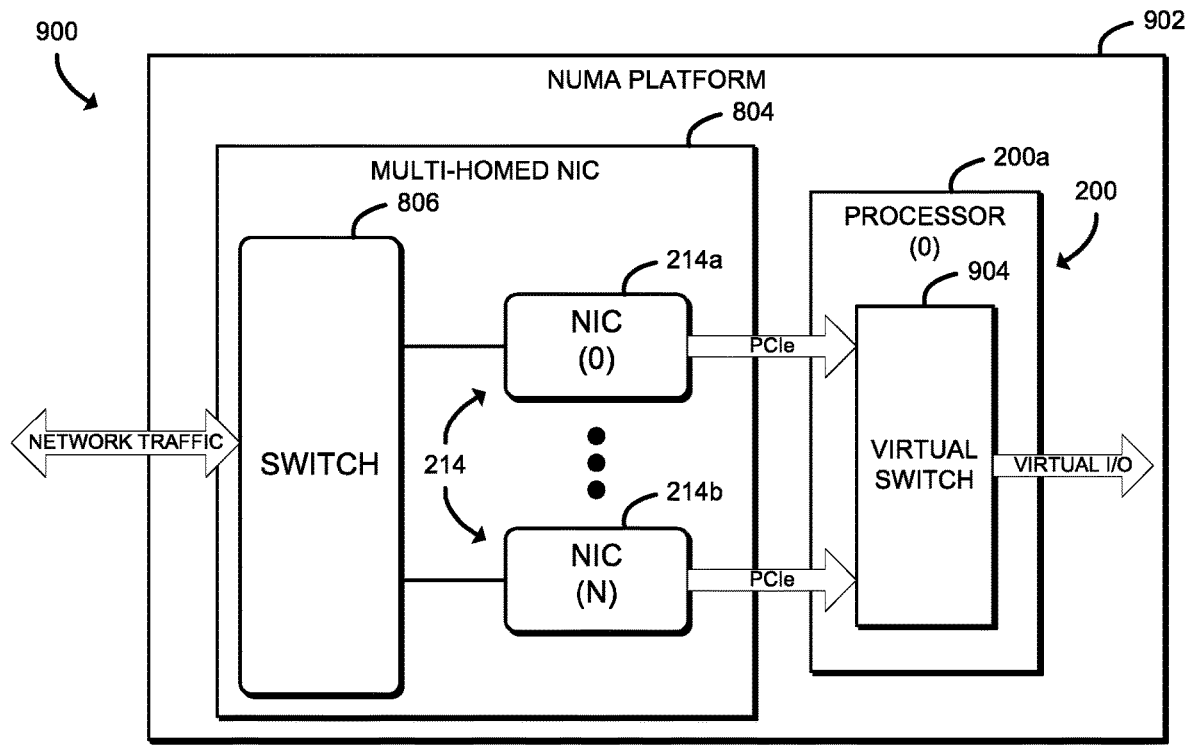
FIG. 9 is a simplified block diagram of at least one embodiment of another NIC resource cluster of the compute node of FIGS. 1-3 that includes a multi-homed NIC in a NUMA platform design communicatively coupled to a processor of the compute node via a virtual switch.

Referring now to FIGS. 8 and 9, in use, the compute node 106 establishes illustrative NIC resource clusters 800 and 900, respectively, for the hierarchical clustering of NICs in NFV deployments. With regard to FIG. 8, the illustrative NIC resource cluster 800 includes a non-uniform memory access (NUMA) platform 802 with a multi-homed NIC 804 that includes a switch 806 and multiple NICs 214. The switch 806 may be embodied as any type of physical or virtual switch that is capable of facilitating the flow of network traffic to/from the NICs 214. The illustrative NICs 214 include a first NIC designated as NIC (0) 214a, and a second NIC designated as NIC (N) 214b (i.e., the "Nth" NIC 214, wherein "N" is a positive integer and designates one or more additional NICs 214). Each of the illustrative NICs 214 is communicatively coupled to a respective processor 200, such as by the PCIe interconnect, as illustratively shown. The illustrative processors 200 include a first processor designated as processor (0) 200a, and a second processor designated as processor (N) 200c (i.e., the "Nth" processor 200, wherein "N" is a positive integer and designates one or more additional processors 200).

Referring now to FIG. 9, similar to FIG. 8, the illustrative NIC resource cluster 900 includes the NUMA platform 802 with the multi-homed NIC 804 that includes the switch 806 and the multiple NICs 214. However, unlike the illustrative NIC resource cluster 800 of FIG. 8, the NICs 214 of the illustrative NIC resource cluster 900 is communicatively coupled to a virtual switch 904 on a single processor, illustratively shown as processor (0) 200a. It should be appreciated that, while not illustratively shown for clarity of the description, the virtual switch 904 is communicatively coupled to one or more VMs presently running on the compute node 106 for executing the VNFs as described herein.

It should be further appreciated that the virtual switch 904 can decide how to program the network packet processing pipeline on each NIC 214, depending on the network profile. For example, the virtual switch 904 may apply different parser graphs to enable acceleration of different protocols for complex network profiles. In case of converged edge deployments, for example, one VNF may need acceleration of GPRS Tunneling Protocol (GTP) for mobile networks and another VNF may need acceleration of Point-to-Point Protocol over Ethernet (PPPoE) for broadband networks. Accordingly, each NIC 214 does not need to simultaneously support every protocol, as the protocol support can be distributed across the NICs 214.

Furthermore, in alternative embodiments, the resource cluster may be comprised of one or more accelerators and one or more general purpose processors. In such embodiments, it should be understood that the same logic as described herein as related to the cluster of accelerators may be applied. For example, such logic may be employed to load a hardware profile to the accelerator(s) for performing priority operations, while the other operations may be performed by the general purpose processor(s).

EXAMPLES

Illustrative examples of the technologies disclosed herein are provided below. An embodiment of the technologies may include any one or more, and any combination of, the examples described below.

Example 1 includes a compute node for hierarchical clustering of hardware resources in network function virtualization (NFV) deployments, the compute node comprising network function deployment management circuitry to create a network function profile that includes a plurality of network functions to be deployed on the compute node; translate the network function profile into a hardware profile for each of a plurality of interconnected hardware resources, wherein the hardware profile is usable to identify which of the plurality of network functions are to be managed by each of the plurality of interconnected hardware resources; and deploy each of the plurality of network functions to one or more of the plurality of interconnected hardware resources based on the hardware profile.

Example 2 includes the subject matter of Example 1, and wherein the plurality of interconnected hardware resources comprises a plurality of accelerators of the compute node.

Example 3 includes the subject matter of any of Examples 1 and 2, and wherein to translate the network function profile into a hardware profile for each of the plurality of interconnected hardware resources comprises to translate the network function profile into a plurality of accelerator profiles, and wherein each of the plurality of accelerator profiles corresponds to a respective one of the plurality of accelerators.

Example 4 includes the subject matter of any of Examples 1-3, and wherein the plurality of interconnected hardware resources comprises at least one accelerator of the compute node and at least one general purpose processor of the compute node.

Example 5 includes the subject matter of any of Examples 1-4, and wherein the plurality of interconnected hardware resources comprises a plurality of network interface controllers communicatively coupled to a switch.

Example 6 includes the subject matter of any of Examples 1-5, and wherein to translate the network function profile into a hardware profile for each of the plurality of interconnected hardware resources comprises to translate the network function profile into a plurality of network interface controller (NIC) packet processing pipeline profiles, and wherein each of the plurality of NIC packet processing pipeline profiles corresponds to a respective one of the plurality of network interface controllers.

Example 7 includes the subject matter of any of Examples 1-6, and wherein the network function profile includes a percentage of total network traffic to be processed for each of the plurality of network functions.

Example 8 includes the subject matter of any of Examples 1-7, and wherein the network function profile includes a number of required sockets of the compute node on which each network function is to be deployed.

Example 9 includes the subject matter of any of Examples 1-8, and wherein the network function profile includes a priority level for each of the plurality of network functions.

Example 10 includes the subject matter of any of Examples 1-9, and wherein the network function profile comprises a hierarchical tree of the plurality of network functions based on a corresponding priority level of each of the plurality of network functions.

Example 11 includes one or more machine-readable storage media comprising a plurality of instructions stored thereon that, in response to being executed, cause a compute node to create a network function profile that includes a plurality of network functions to be deployed on the compute node; translate the network function profile into a hardware profile for each of a plurality of interconnected hardware resources, wherein the hardware profile is usable to identify which of the plurality of network functions are to be managed by each of the plurality of interconnected hardware resources; and deploy each of the plurality of network functions to one or more of the plurality of interconnected hardware resources based on the hardware profile.

Example 12 includes the subject matter of Example 11, and wherein the plurality of interconnected hardware resources comprises a plurality of accelerators of the compute node.

Example 13 includes the subject matter of any of Examples 11 and 12, and wherein to translate the network function profile into a hardware profile for each of the plurality of interconnected hardware resources comprises to translate the network function profile into a plurality of accelerator profiles, and wherein each of the plurality of accelerator profiles corresponds to a respective one of the plurality of accelerators.

Example 14 includes the subject matter of any of Examples 11-13, and wherein the plurality of interconnected hardware resources comprises at least one accelerator of the compute node and at least one general purpose processor of the compute node.

Example 15 includes the subject matter of any of Examples 11-14, and wherein the plurality of interconnected hardware resources comprises a plurality of network interface controllers communicatively coupled to a switch.

Example 16 includes the subject matter of any of Examples 11-15, and wherein to translate the network function profile into a hardware profile for each of the plurality of interconnected hardware resources comprises to translate the network function profile into a plurality of network interface controller (NIC) packet processing pipeline profiles, and wherein each of the plurality of NIC packet processing pipeline profiles corresponds to a respective one of the plurality of network interface controllers.

Example 17 includes the subject matter of any of Examples 11-16, and wherein the network function profile includes a percentage of total network traffic to be processed for each of the plurality of network functions.

Example 18 includes the subject matter of any of Examples 11-17, and wherein the network function profile includes a number of required sockets of the compute node on which each network function is to be deployed.

Example 19 includes the subject matter of any of Examples 11-18, and wherein the network function profile includes a priority level for each of the plurality of network functions.

Example 20 includes the subject matter of any of Examples 11-19, and wherein the network function profile comprises a hierarchical tree of the plurality of network functions based on a corresponding priority level of each of the plurality of network functions.

Example 21 includes a compute node for hierarchical clustering of hardware resources in network function virtualization (NFV) deployments, the compute node comprising means for creating a network function profile that includes a plurality of network functions to be deployed on the compute node; means for translating the network function profile into a hardware profile for each of a plurality of interconnected hardware resources, wherein the hardware profile is usable to identify which of the plurality of network functions are to be managed by each of the plurality of interconnected hardware resources; and means for deploying each of the plurality of network functions to one or more of the plurality of interconnected hardware resources based on the hardware profile.

Example 22 includes the subject matter of Example 21, and wherein the plurality of interconnected hardware resources comprises a plurality of accelerators of the compute node, wherein the means for translating the network function profile into a hardware profile for each of the plurality of interconnected hardware resources comprises means for translating the network function profile into a plurality of accelerator profiles, and wherein each of the plurality of accelerator profiles corresponds to a respective one of the plurality of accelerators.

Example 23 includes the subject matter of any of Examples 21 and 22, and wherein the plurality of interconnected hardware resources comprises a plurality of network interface controllers communicatively coupled to a switch, wherein the means for translating the network function profile into a hardware profile for each of the plurality of interconnected hardware resources comprises means for translating the network function profile into a plurality of network interface controller (NIC) packet processing pipeline profiles, and wherein each of the plurality of NIC packet processing pipeline profiles corresponds to a respective one of the plurality of network interface controllers.

Example 24 includes the subject matter of any of Examples 21-23, and wherein the network function profile includes at least one of (i) a percentage of total network traffic to be processed for each of the plurality of network functions, (ii) a number of required sockets of the compute node on which each network function is to be deployed, and (iii) a priority level for each of the plurality of network functions.

Example 25 includes the subject matter of any of Examples 21-24, and wherein the network function profile comprises a hierarchical tree of the plurality of network functions based on a corresponding priority level of each of the plurality of network functions.

The invention claimed is:

1. A compute node for hierarchical clustering of hardware resources in network function virtualization (NFV) deployments, the compute node comprising:
   circuitry to automatically and without user intervention:
      create a network function profile that includes a plurality of network functions to be deployed on the compute node;
      store the network function profile;
      translate the network function profile into a plurality of accelerator profiles, each of the plurality of accelerator profiles corresponding to a respective one of a plurality of hardware accelerators included in a plurality of interconnected hardware resources that reside on the compute node, wherein the plurality of accelerator profiles are usable to identify which of the plurality of network functions are to be supported by respective one or more hardware accelerators from among the plurality of hardware accelerators;
      store the plurality of accelerator profile; and
      cause the plurality of network functions to be deployed to the plurality of hardware accelerators based on the stored accelerator profiles.

2. The compute node of claim 1, wherein the plurality of interconnected hardware resources further includes at least one general purpose processor of the compute node.

3. The compute node of claim 1, wherein the plurality of interconnected hardware resources further includes a plurality of network interface controllers communicatively coupled to a switch.

4. The compute node of claim 1, wherein the stored network function profile includes a percentage of total network traffic to be processed for each of the plurality of network functions.

5. The compute node of claim 1, wherein the stored network function profile includes a number of required sockets of the compute node on which each network function is to be deployed.

6. The compute node of claim 1, wherein the stored network function profile includes a priority level for each of the plurality of network functions.

7. The compute node of claim 1, wherein the stored network function profile comprises a hierarchical tree of the plurality of network functions based on a corresponding priority level of each of the plurality of network functions.

8. One or more non-transitory machine-readable storage media comprising a plurality of instructions stored thereon that, in response to being executed, cause a compute node to:
   create, automatically and without user intervention, a network function profile that includes a plurality of network functions to be deployed on the compute node;
   store the network function profile;
   translate the network function profile into a plurality of accelerator profiles, each of the plurality of accelerator profiles corresponding to a respective one of a plurality of hardware accelerators included in a plurality of interconnected hardware resources that reside on the compute node, wherein the plurality of accelerator profiles are usable to identify which of the plurality of network functions are to be supported by respective one or more hardware accelerators from among the plurality of hardware accelerators;
   store the plurality of accelerator profiles; and
   cause the plurality of network functions to be deployed to the plurality of hardware accelerators based on the stored accelerator profiles.

9. The one or more non-transitory machine-readable storage media of claim 8, wherein the plurality of interconnected hardware resources further includes at least one general purpose processor of the compute node.

10. The one or more non-transitory machine-readable storage media of claim 8, wherein the plurality of interconnected hardware resources further includes a plurality of network interface controllers communicatively coupled to a switch.

11. The one or more non-transitory machine-readable storage media of claim 8, wherein the stored network function profile includes a percentage of total network traffic to be processed for each of the plurality of network functions.

12. The one or more non-transitory machine-readable storage media of claim 8, wherein the stored network function profile includes a number of required sockets of the compute node on which each network function is to be deployed.

13. The one or more non-transitory machine-readable storage media of claim 8, wherein the stored network function profile includes a priority level for each of the plurality of network functions.

14. The one or more non-transitory machine-readable storage media of claim 8, wherein the stored network function profile comprises a hierarchical tree of the plurality of network functions based on a corresponding priority level of each of the plurality of network functions.

\* \* \* \* \*